United States Patent [19]
Sol

[11] Patent Number: 5,107,429
[45] Date of Patent: Apr. 21, 1992

[54] ADAPTIVE THROTTLE CONTROLLER FOR VEHICLE TRACTION CONTROL

[75] Inventor: David Sol, Dearborn, Mich.
[73] Assignee: Ford Motor Company, Dearborn, Mich.
[21] Appl. No.: 535,679
[22] Filed: Jun. 11, 1990
[51] Int. Cl.[5] .............................................. B60K 41/20
[52] U.S. Cl. ................................ 364/426.03; 180/197
[58] Field of Search ...................... 364/426.01–426.03, 364/161; 180/197

[56] References Cited

U.S. PATENT DOCUMENTS

| | | | |
|---|---|---|---|
| 4,410,947 | 10/1983 | Strong et al. | 364/426.03 |
| 4,681,374 | 7/1987 | Nakamura et al. | 303/106 |
| 4,685,547 | 8/1987 | Ohashi et al. | 192/3 R |
| 4,722,411 | 2/1988 | Ohashi et al. | 180/197 |
| 4,739,856 | 4/1988 | Inagaki et al. | 180/197 |
| 4,768,608 | 9/1988 | Hrovat | 180/197 |
| 4,771,848 | 9/1988 | Mamba et al. | 180/197 |
| 4,811,808 | 3/1989 | Matsumoto et al. | 180/197 |
| 4,843,552 | 6/1989 | Inagaki | 364/426.03 |
| 4,955,449 | 9/1990 | Hilburger et al. | 180/197 |
| 5,009,294 | 4/1991 | Ghoneim | 192/1.22 |
| 5,033,002 | 7/1991 | Sol | 364/426.03 |

*Primary Examiner*—Thomas G. Black
*Attorney, Agent, or Firm*—Roger L. May; Allan J. Lippa

[57] ABSTRACT

An adaptive throttle controller for vehicle traction control is capable of adapting to changes in vehicle and engine parameters in order to compensate for uncertainties in vehicle parameters. The controller operates in a self-tuning mode by varying feedback gains online based on input/output relationships. The throttle controller system includes a wheel speed sensor for providing a first feedback variable related to wheel spin error, a traction controller for providing a second feedback variable related to throttle position, and a throttle control system responsive to the first and second feedback variable for controlling the throttle position to prevent wheel spin. The traction control method includes the steps of providing a wheel speed sensor for generating a first feedback variable related to wheel spin error, providing a traction controller for generating a second feedback variable related to throttle position, and providing a throttle control system responsive to the first and second feedback variables for controlling the throttle position to prevent wheel spin.

18 Claims, 5 Drawing Sheets

ADAPTIVE THROTTLE CONTROLLER FOR VEHICLE TRACTION CONTROL

BACKGROUND OF THE INVENTION

The invention relates generally to vehicle throttle control and, more particularly, to a method and apparatus for controlling vehicle traction on slippery surfaces through throttle variation. Longitudinal vehicle acceleration is controlled by adapting parameters online, with the controller operating to vary feedback gains online based on input/output relationships.

Currently, throttle control systems generally control vehicle acceleration by using fixed parameters online to vary engine throttle and to thereby maximize traction. For example, U.S. Pat. No. 4,843,552 issued to Inagaki discloses a wheel slip control system which controls the rotation of drive wheels to increase the frictional force between the drive wheels and the road surface. The rotation of the drive wheels is controlled by regulating the output power of an internal combustion engine. The difference between the drive wheel speed and the follower speed is used to determine the occurrence of slip.

Another throttle control system is disclosed in U.S. Pat. No. 4,768,608 issued to Hrovat. The Hrovat patent discloses an antislip control method and system for controlling the wheel slip of a vehicle having at least one driven wheel coupled to an internal combustion engine. The control system is basically a simple feedback system having three feedback gains which are fixed. Finally, U.S. Pat. No. 4,771,848 issued to Namba et al discloses a vehicle acceleration control system for controlling traction. The system prevents or limits the slip of vehicle wheels to enable a smooth start and to maximize acceleration. The Namba et al system has fixed gains which are not adaptable. It is seen then that there is a need for a vehicle traction controller in which the traction control, rather than being fixed, is capable of adapting to changes in vehicle and engine parameters in order to compensate for uncertainties in vehicle parameters.

SUMMARY OF THE PRESENT INVENTION

The present invention solves for this need by providing a vehicle traction controller which controls vehicle traction on slippery roads and hills not only through throttle variation, but also through variation of the strength with which that throttle is varied. Based on measured wheel spin error, the controller generally increases or decreases throttle position for increased traction in an adaptive fashion, thereby providing improved acceleration, vehicle performance, and vehicle stability while preventing overspin. Previous wheel spin information is retained and used to calculate a feedback gain, which is also retained. Using current and prior errors and gains, the change in throttle position is computed in an adaptive, continuously updated manner.

The present invention relates to a control system for a vehicle. The system comprises a means for sensing wheel speed error to provide a first feedback variable related to wheel speed error; a traction controller for providing a second feedback variable related to throttle position; and a throttle control system responsive to the first and second feedback variables for controlling the throttle position to regulate wheel spin. In a preferred embodiment of the present invention the second feedback variable is a demand signal which represents a change in throttle position. Also, a preferred embodiment includes an engine control system for generating engine and vehicle parameters responsive to this second feedback variable.

In the traction control system, the traction controller comprises: a feedback gain computer for providing a proportional adaptation feedback gain and an integral adaptation feedback gain, which gains adapt on line according to changes in vehicle and engine parameters; and a throttle position change computer for providing a change in throttle position demand signal. The traction controller may further include a deadband for providing system stability.

The feedback gain computer comprises: a means for storing a previous wheel spin error; a means for storing a current wheel spin error; first summing means for summing the current wheel spin error the negative previous wheel spin error; multiplying means for multiplying the first summing means value and the current wheel spin error to provide a multiplied value; means for applying a proportional adaptation feedback gain to the multiplied value to provide a first gain value; squaring means for squaring the current wheel spin error to provide a squared value; means for applying an integral adaptation feedback gain to the squared value to provide a second gain value; and second summing means for summing the first gain value and the second gain value to generate a current feedback gain.

Finally, the throttle position change computer comprises: a first summer for providing a signal representing the current wheel spin error minus the previous wheel spin error; a second summer for providing a signal representing the current gain minus the previous gain; a first multiplier responsive to the first summer for providing an adjusted current wheel spin error; a second multiplier responsive to the second summer for providing an adjusted current gain; and a third summer for summing the adjusted current gain and the adjusted current wheel spin error to provide a throttle correction signal.

The present invention further provides an adaptive feedback control method for controlling the throttle position of a vehicle. The method comprises the steps of: generating a first feedback variable related to wheel spin error; generating a second feedback variable related to throttle position; and providing an adaptive traction controller responsive to the first feedback variable and the second feedback variable for adapting throttle position to regulate wheel slip. The adaptive traction controller controls throttle position according to the method comprising the steps of: generating a first feedback variable related to the wheel slip; generating a proportional adaptation feedback gain proportional to the first feedback variable; generating an integral adaptation feedback gain integrally related to the first feedback variable; summing the proportional adaptation feedback gain and the integral adaptation feedback gain to provide a gain control signal; and applying the gain control signal to a throttle position change computer for controlling the throttle position of the vehicle to prevent excessive wheel slip. In a preferred embodiment, the adaptive traction controller includes the step of providing a deadband for system stability.

The present invention provides a feedback control method for a vehicle, which method comprises the steps of: sensing a wheel speed error and generating a first feedback variable in response thereto; providing a traction controller for generating a second feedback variable related to throttle position; and providing a throttle control system responsive to the first and second feedback variables for controlling the throttle position to prevent excessive wheel spin. In a preferred embodiment, an engine control system responsive to the second feedback variable is also provided, and the second feedback variable is preferably a demand signal which indicates a change in throttle position.

In the feedback control method, the step of providing a traction controller includes providing a feedback gain computer for generating a proportional adaptation feedback gain and an integral adaptation feedback gain, which gains adapt on line according to changes in vehicle and engine parameters; and providing a throttle position change computer for generating a change in throttle position demand signal. In a preferred embodiment of the present invention, the traction controller further includes a deadband for system stability.

In the feedback control method, the step of providing a feedback gain computer comprises the steps of: storing a previous wheel spin error; storing a current wheel spin error; summing the current and the negative of the Previous wheel spin errors; providing a multiplier for multiplying the value from the summer with the current wheel spin error; applying a proportional adaptation feedback gain to this multiplied value; squaring the current wheel spin error; applying an integral adaptation feedback gain to the squared value; and summing the result of applying a proportional adaptation feedback gain to the multiplied wheel spin error values with the result of applying the integral adaptation feedback gain to the squared current wheel spin error value to generate a current feedback gain. Also, the step of providing a throttle position change computer comprises the steps of: generating a signal from a first summer which represents the current wheel spin error minus the previous wheel spin error; generating a signal from a second summer which represents the current gain minus the previous gain; providing a first multiplier responsive to the first summer to generate an adjusted current wheel spin error; providing a second multiplier responsive to the second summer to generate an adjusted current gain; and providing a third summer for summing the adjusted current gain and the adjusted current wheel spin error to provide a throttle correction signal.

Other objects and advantages of the invention will be apparent from the following description, the accompanying drawings and the appended claims.

DETAILED DESCRIPTION OF THE INVENTION

The present invention controls vehicle traction on any road surface, including slippery roads and hills, through throttle variation. Based on measured wheel spin error, the controller increases or decreases throttle position for increased traction, improving acceleration and preventing overspin. A particular advantage of this invention is that it improves vehicle performance and vehicle stability and safety. Previous wheel spin error information is retained and used to calculate a feedback gain, which calculated feedback gain is also retained. Using prior and current errors and gains, the change in throttle position is computed in an adaptive, continuously updated fashion such that the system learns from prior input/output relationships.

Figure 1:
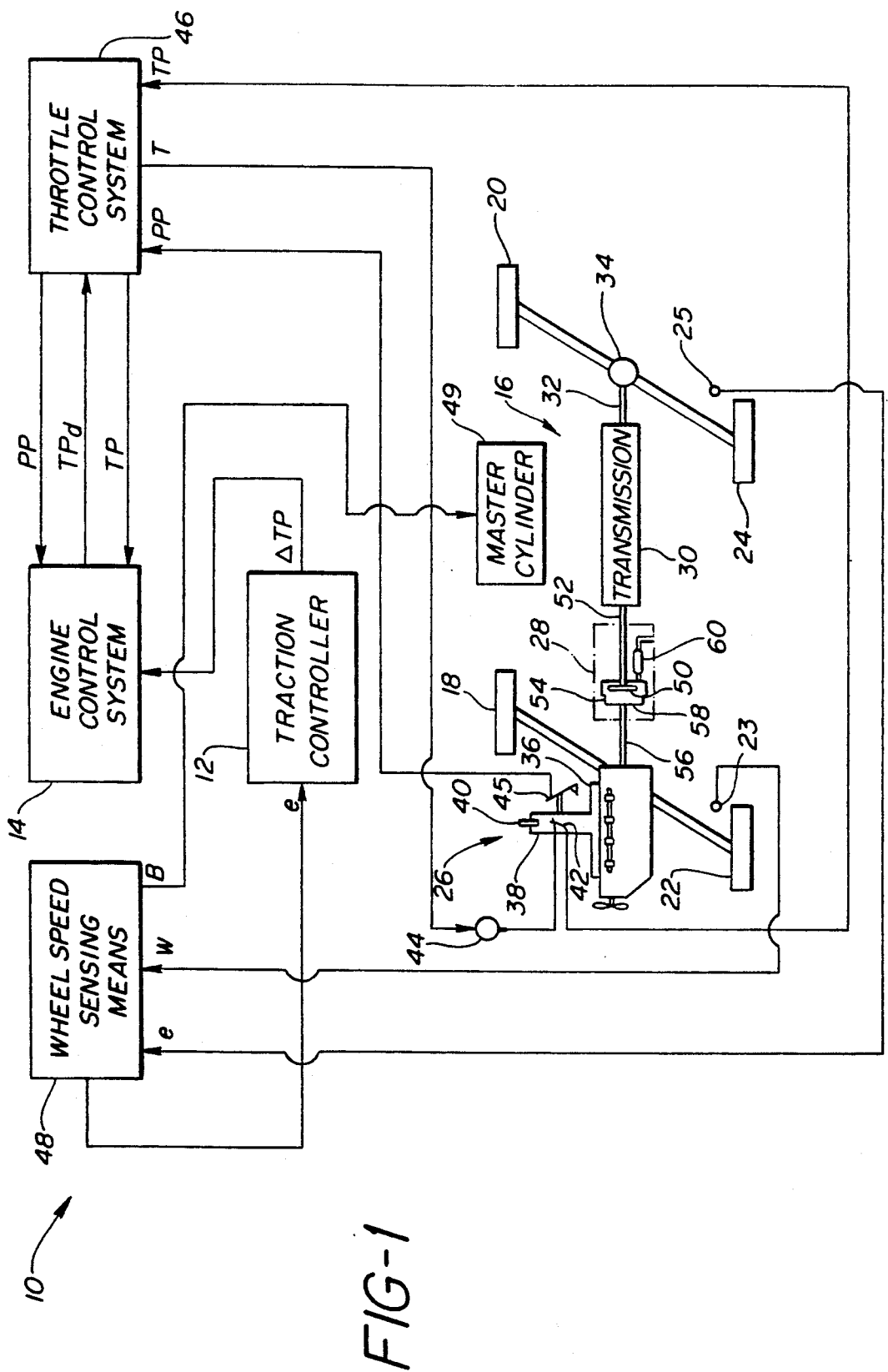
FIG. 1 is a schematic showing a conventional motor vehicle controlled by the control systems described herein.

Referring now to FIG. 1, reference number 10 generally refers to a schematic of a motor vehicle controlled by the adaptive feedback control system described herein. In general terms which are described in greater detail hereinafter, traction controller 12 and engine control system 14 are shown as feedback control systems receiving inputs from and controlling motor vehicle 16 when detected wheel slip exceeds a desired or preselected value.

Motor vehicle 16 is shown in this particular example as having four wheels, 18, 20, 22, and 24, and an internal combustion engine 26 coupled to drive wheel 24 via clutch 28, automatic transmission 30, driveshaft 32, and differential/axle 34. Engine 26 is shown in this example as including an intake manifold 36 for inducting an air/fuel mixture therein via air/fuel intake 38. Fuel injector 40, shown as a portion of a central fuel injected system in this example, injects fuel into air/fuel intake 38. Throttle plate 42 is shown here actuated by servo motor 44 in response to throttle controller 46 for adjusting flow through the air/fuel intake 38 in a conventional manner. The throttle plate 42 is normally opened by the vehicle operator depressing the accelerator pedal 45. Finally, the vehicle 16 powered by the engine 26 includes an operator actuated wheel speed sensing means 48 shown coupled to master cylinder 49 via the brake signal B. The wheel speed sensing means 48 is the difference between the wheel speed of the driven wheel 24 determined at sensor 25 and the wheel speed of the non-driven wheel 22 determined at sensor 23.

It is to be understood that the feedback control system described herein may be used to advantage with any type of combustion engine such as, for example, carbureted engines, multiport fuel injected engines, and direct fuel injected engines. Further, the feedback control system is not limited to automobiles, but may be used to advantage with any apparatus having an engine coupled to a drive wheel through an axle.

Continuing with FIG. 1, clutch 28 is shown including clutch plates 50 coupled to transmission shaft 52, and friction elements 54 operably coupled to engine shaft 56 via clutch housing 58. Hydraulic piston 60 is shown coupled to friction elements 54 for coupling and decoupling clutch plates 50 to friction elements 54 thereby coupling and decoupling engine 26 to transmission 30. The amount of torque coupled from engine 26 to transmission 30 is controlled by slippage of clutch 28.

Figure 2:
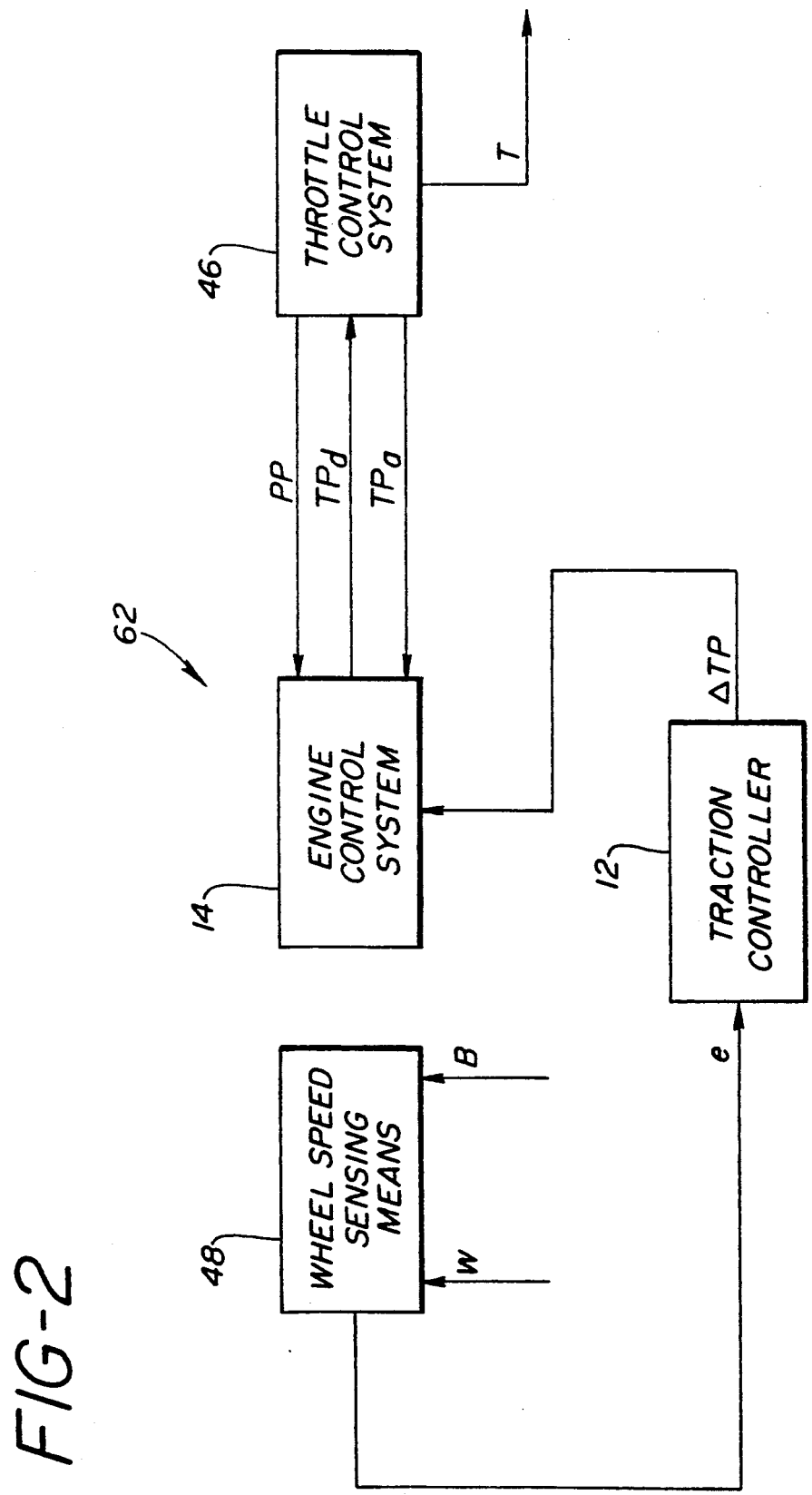
FIG. 2 is a block diagram of the adaptive throttle control system of the present invention.

Referring now to FIG. 2, and continuing with FIG. 1, the adaptive feedback control system of FIG. 1 is shown schematically as a block diagram 62 of computational and measurement steps represented as blocks. Each block shown herein describes an operation or step performed by the feedback control system. It is noted that these operations may also be performed by discrete components wherein each block comprises an array of circuits such as, for example, integrated circuit adders and multipliers.

The block diagram of FIG. 2 illustrates a method of controlling vehicle traction on slippery surfaces and hills. A vehicle measurement of wheel spin error, e, of the driven wheel 24 is provided to the traction controller 12 by the wheel speed sensing means 48. Previous wheel spin error information is retained and used by the traction controller 12 to calculate a feedback gain. The calculated feedback gain is also retained and, using current and prior errors and gains, the change in throttle position $\Delta TP$ is computed in an adaptive, continuously updated fashion by the traction controller 12.

The traction controller 12 outputs the change in throttle position as a demand signal to the engine control system 14. The engine control system 14 interacts with the throttle controller 46 by comparing the actual throttle position $TP_a$ and the actual acceleration pedal position PP to the required throttle position $TP_d$ from the traction controller 12. If the throttle position required is different from the actual throttle position, the throttle controller adjusts the throttle position for increased traction, thereby providing improved traction and acceleration through throttle variation. Thus, the traction controller 12 computes optimum throttle position in an adaptive, continuously updated fashion by learning from prior input/output relationships.

Figure 3:
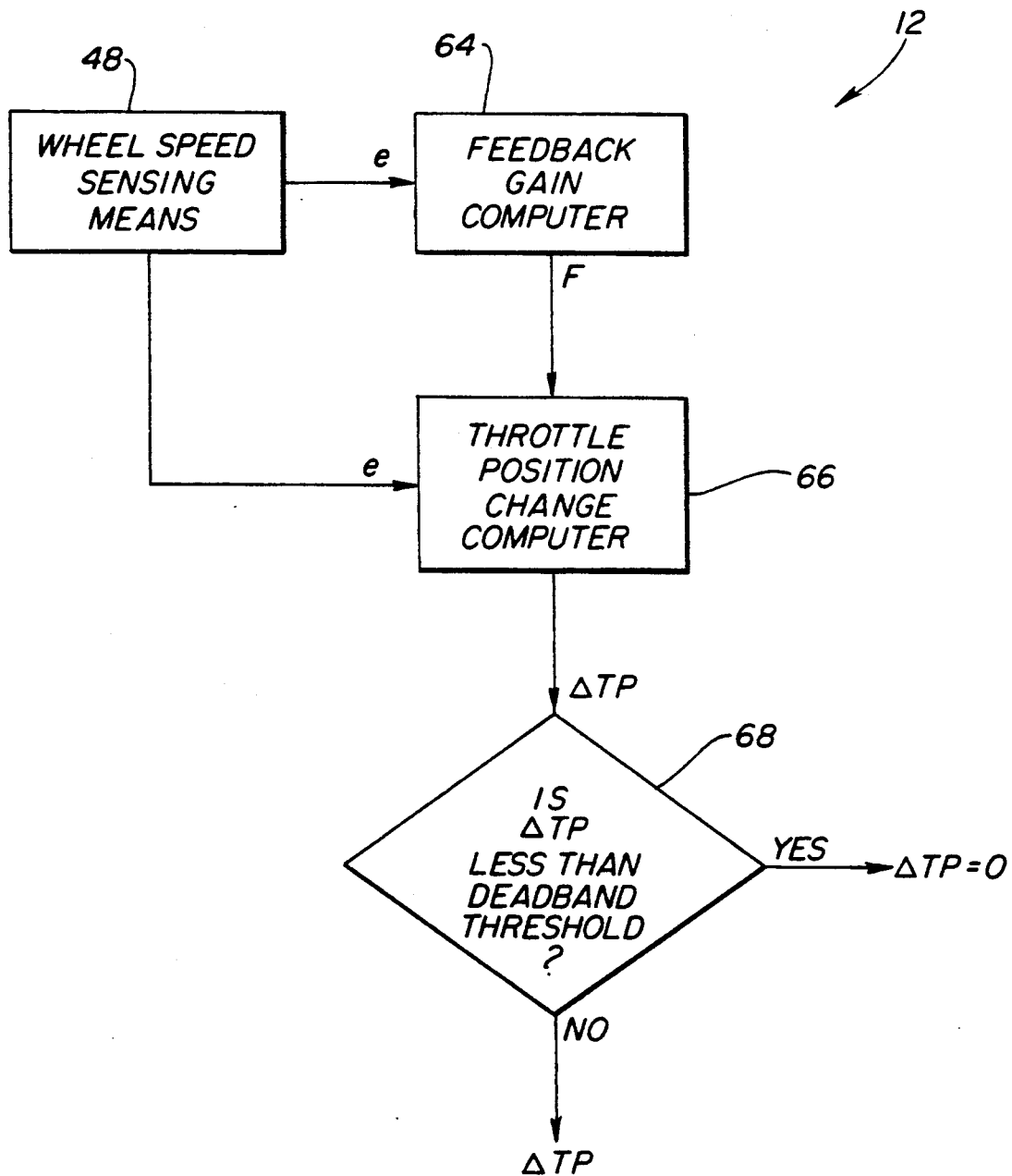
FIG. 3 is a block diagram of the traction controller block shown in FIGS. 1 and 2.

Referring now to FIG. 3 and continuing with FIG. 2, traction controller 12 is shown in more detail as a schematic flow chart of computational and decision making steps represented as blocks. Each block shown herein describes an operation performed by the controller. It is noted that these operations may also be performed by discrete components wherein each block comprises an array of circuits such as, for example, integrated adders and multipliers.

Traction controller 12 includes a feedback gain computer 64 which accepts the wheel spin error information, which is a first feedback variable, from the wheel speed sensing means 48 and uses this information to calculate a feedback gain F. The calculated feedback gain and the wheel spin error information are then provided to a throttle position change computer 66 which continuously computes the change in throttle position, $\Delta TP$, which is required for optimum vehicle traction. The change in throttle position demand signal is a second feedback variable.

In a preferred embodiment of the present invention, as illustrated in FIG. 3, the traction controller 12 may further include a decision block 68 for providing system stability. The decision block 68 may be a deadband wherein the throttle position is not corrected for minimal changes, such as when the signal-to-noise ratio is low. If the change in throttle position is less than the deadband threshold, then the correction is so small as to be negligible. An advantage of the deadband is that the throttle position will not be changed until the required change in throttle position calculated by the throttle position change computer 66 is sufficiently large that traction can be improved by adjusting the throttle position.

Figure 4:
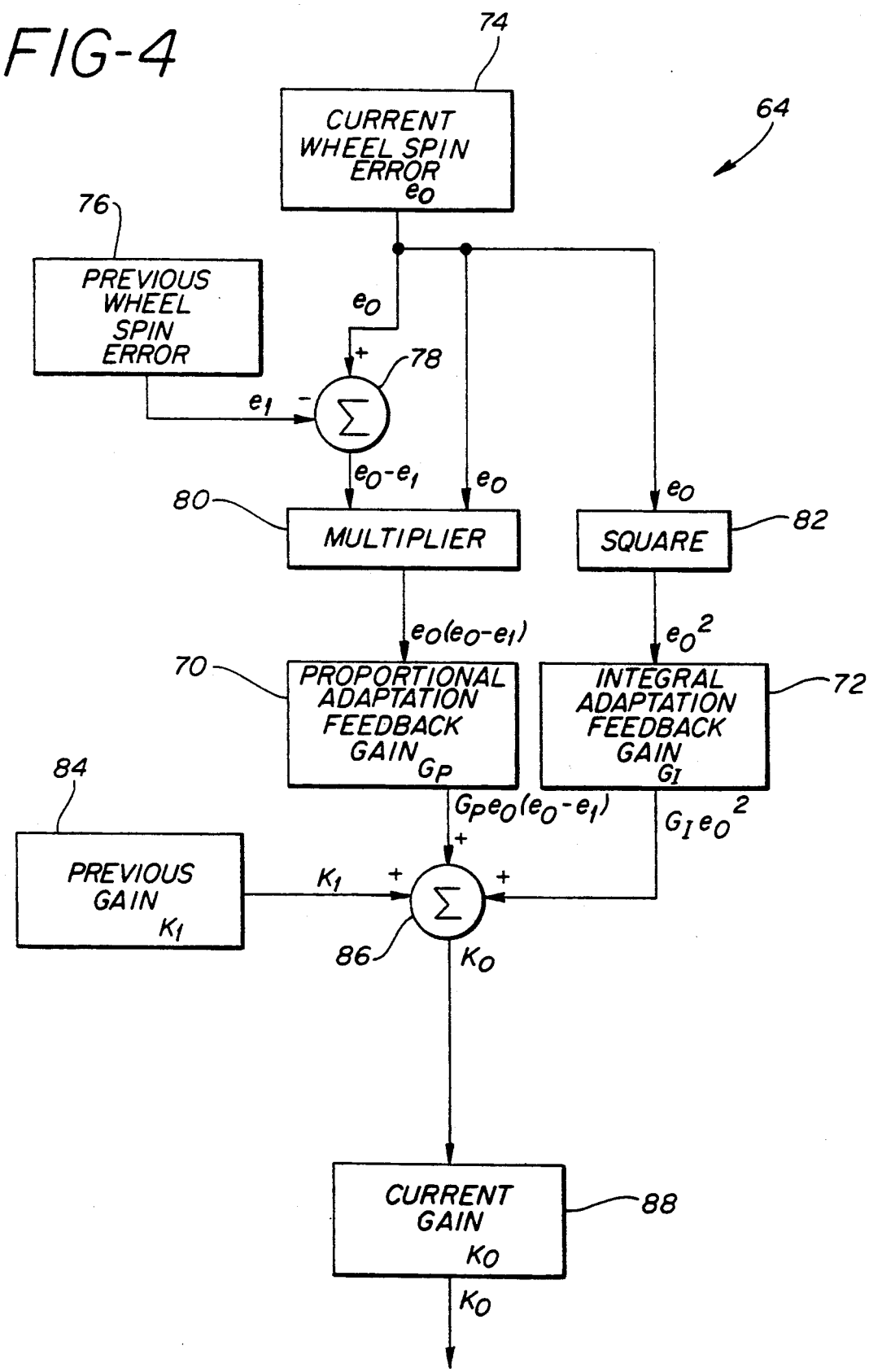
FIG. 4 is a block diagram of the feedback gain computer block shown in FIG. 3.

Referring now to FIG. 4, the feedback gain computer 64 of FIG. 3 is shown schematically as a flow chart of computational and decision making steps represented as blocks. Each block shown herein describes an operation performed by the feedback gain computer. It is noted that these operations may also be performed by discrete components wherein each block comprises an array of circuits such as, for example, integrated adders and multipliers.

The feedback gain computer 64 provides a proportional adaptation feedback gain at block 70 and an integral adaptation feedback gain at block 72, which gains 70 and 72 adapt on line according to changes in vehicle and engine parameters. The current wheel spin error $e_0$ at block 74 is stored at block 76, and a signal $e_1$ is output. Once the negative of delayed wheel spin error $e_1$ and the current wheel spin error $e_0$ have been summed at a first summer 78, then multiplier 80 applies a value to the proportional adaptation feedback gain block 70 according to the equation $$e_0(e_0 - e_1)$$

and a squaring means, square 82, applies a value to the integral adaptation feedback gain block 72 according to the equation $$e_0^2.$$

The proportional adaptation feedback gain block 70 multiplies a proportional adaptation feedback gain $G_P$ by the equation $e_0(e_0 - e_1)$, and the integral adaptation feedback gain block 72 multiplies an integral adaptation feedback gain $G_I$ by the equation $e_0^2$.

The feedback gain computer 64 further includes a means for storing a previous feedback gain $K_1$, which means is shown as block 84 in FIG. 4. The previous feedback gain is summed with the output of the proportional adaptation feedback gain block 70 and the output of the integral adaptation feedback gain block 72 at a second summer 86, to generate a current feedback gain $K_0$ to block 88, which gain is applied to the throttle position change computer 66 of FIG. 3. The current feedback gain at block 88 is stored and retrievable as the previous stored feedback gain $K_1$ at block 84.

Figure 5:
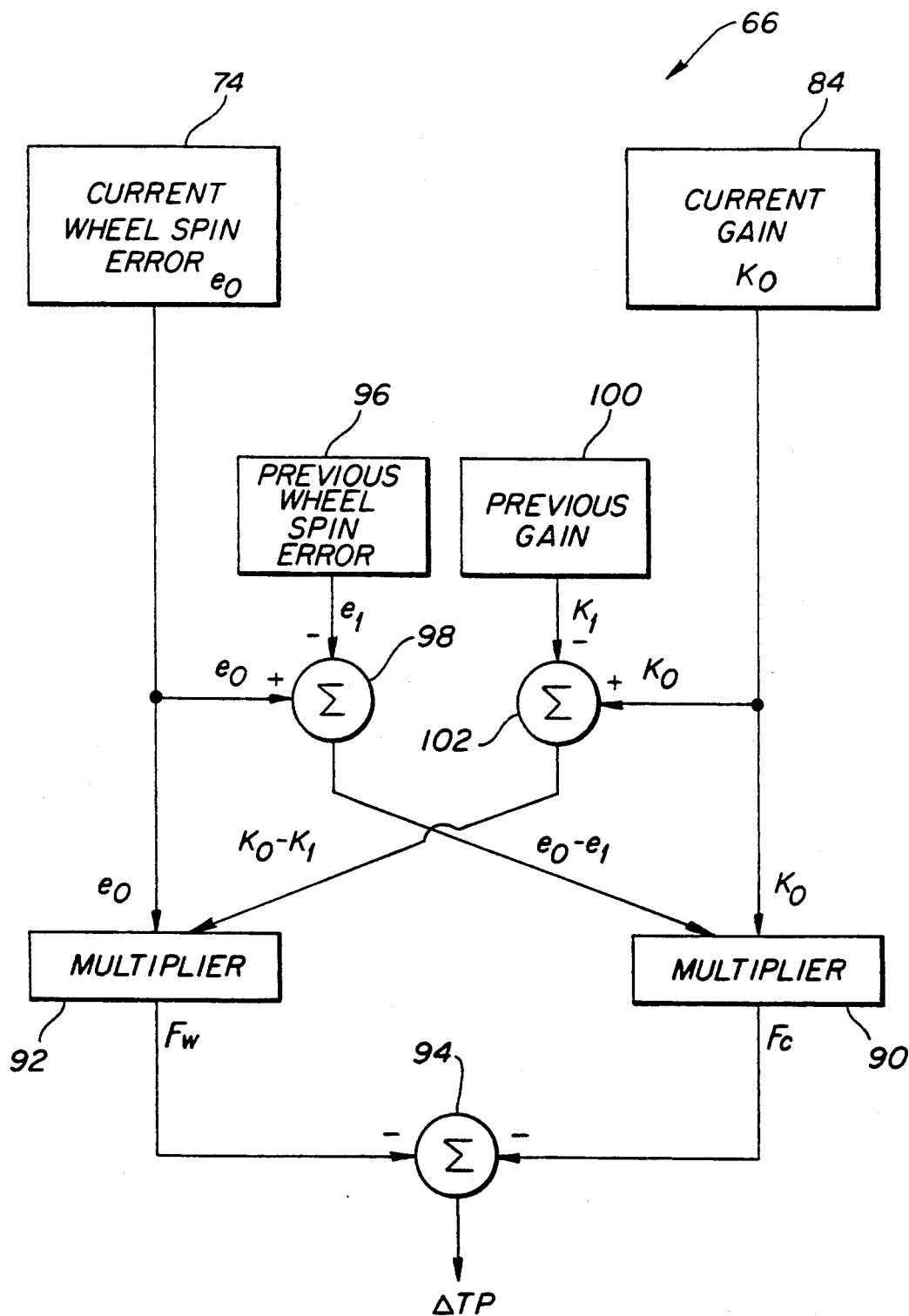
FIG. 5 is a block diagram of the throttle position change computer block shown in FIG. 3.

Referring now to FIG. 5, the throttle position change computer 66 of FIG. 3 is shown schematically as a flow chart of computational and decision making steps represented as blocks. Each block shown herein describes an operation performed by the throttle position change computer 66. It is noted that these operations may also be performed by discrete components wherein each block comprises an array of circuits such as, for example, integrated adders and multipliers.

The throttle position change computer 66 includes a first multiplier 90 responsive to the feedback gain computer 64 for providing an adjusted current feedback gain Fc, and a second multiplier 92 responsive to the first feedback variable related to wheel spin error for providing an adjusted current wheel spin error Fw. A summer 94, the third summer of FIG. 5, sums the negative values of adjusted current feedback gain and adjusted current wheel spin error to provide the change in throttle position demand signal or throttle correction signal, $\Delta TP$.

The adjusted current feedback gain Fc is calculated by multiplying, at the first multiplier 90, according to the equation $$(e_0 - e_1)*(K_0).$$

The previous wheel spin error is $e_1$, which value is stored and retrievable at block 96. The values of $e_0$ and negative $e_1$ are summed at a first summer 98 and the resulting value is provided to the multiplier 90, along with the current gain value $K_0$ from block 88, to calculate the adjusted current feedback gain Fc. Similarly, a previous gain value $K_1$ is stored and retrievable at block 100, the negative of which is added to the current gain $K_0$ at a second summer 102. The resulting value is applied, along with the current wheel spin error $e_0$, to the second multiplier 92, to generate the adjusted current wheel spin error Fw, according to the equation $$(K_0 - K_1)*(e_0).$$

The negative of the values of Fc and Fw are summed at the third summer 94 to generate a throttle correction value $\Delta TP$, which value is provided to the engine control system 14. The engine control system 14 transmits the throttle position demand for controlling the throttle position of the vehicle to regulate wheel slip.

Having described the invention in detail and by way of reference to preferred embodiments thereof, it will be apparent that modifications and variations are possible without departing from the scope of the invention which is defined in the appended claims.

What is claimed is:

1. A traction control system for a vehicle having a throttle and wheels, the system comprising:
   a first feedback variable related to wheel spin error;
   a second feedback variable related to throttle position, said second feedback variable being proportionately and integrally adaptive on line according to changes in vehicle and engine parameters; and
   an adaptive throttle controller responsive to said first feedback variable and said second feedback variable for adapting throttle position to prevent wheel slip.

2. A traction control system as claimed in claim 1 wherein said first feedback variable related to wheel spin error is provided by a wheel speed sensing means.

3. A traction control system as claimed in claim 1 wherein said second feedback variable related to throttle position is provided by a traction controller.

4. A traction control system as claimed in claim 1 wherein said second feedback variable is a demand signal representing a change in throttle position.

5. A traction control system as claimed in claim 1 further comprising an engine control system responsive to said second feedback variable.

6. An adaptive traction control method for controlling the traction of a vehicle having a throttle and wheels, comprising the steps of:
   generating a first feedback variable related to wheel spin error;
   generating a second feedback variable related to throttle position, said second feedback variable being proportionately and integrally adaptive on line according to changes in vehicle and engine parameters; and
   providing an adaptive throttle controller responsive to said first feedback variable and said second feedback variable for adapting throttle position to prevent wheel slip.

7. An adaptive traction control method as claimed in claim 6 wherein said first feedback variable related to wheel spin error is generated by a wheel speed sensing means.

8. An adaptive traction control method as claimed in claim 6 wherein said second feedback variable related to throttle position is generated by a traction controller.

9. An adaptive traction control method as claimed in claim 6 wherein said second feedback variable is a demand signal representing a change in throttle position.

10. An adaptive traction control method as claimed in claim 6 further comprising the step of providing an engine control system responsive to said second feedback variable.

11. A traction control system for a vehicle having a throttle and wheels, the system comprising:
    a first feedback variable related to wheel spin error;
    a second feedback variable provided by a traction controller, said second feedback variable being related to throttle position, and said traction controller comprising:
       a feedback gain computer for providing a proportional adaptation feedback gain and an integral adaptation feedback gain, which gains adapt on line according to changes in vehicle and engine parameters, and
       a throttle position change computer for generating said second feedback variable; and
    an adaptive throttle controller responsive to said first feedback variable and said second feedback variable for adapting throttle position to prevent wheel slip.

12. A traction control system as claimed in claim 11 wherein said traction controller further comprises a deadband for providing system stability.

13. A traction control system as claimed in claim 11 wherein said feedback gain computer comprises:
    a means for storing a previous wheel spin error;
    a means for storing a current wheel spin error;
    first summing means for summing said current wheel spin error and a negative of said previous wheel spin error;
    multiplying means for multiplying said first summing means value and said current wheel spin error to provide a multiplied value;
    means for applying a proportional adaptation feedback gain to said multiplied value to provide a first gain value;
    squaring means for squaring said current wheel spin error to provide a squared value;
    means for applying an integral adaptation feedback gain to said squared value to provide a second gain value; and
    second summing means for summing said first gain value and said second gain value to generate a current feedback gain.

14. A traction control system as claimed in claim 11 wherein said throttle position change computer comprises:
    means for storing a current wheel spin error;
    means for storing a previous wheel spin error;
    a first summer for providing a signal representing said current wheel spin error minus said previous wheel spin error;
    means for storing a current gain;
    means for storing a previous gain;
    a second summer for providing a signal representing said current gain minus said previous gain;
    a first multiplier responsive to said first summer for providing an adjusted current wheel spin error;
    a second multiplier responsive to said second summer for providing an adjusted current gain; and
    a third summer for summing said adjusted current wheel spin error and said adjusted current gain to provide a throttle correction signal.

15. An adaptive traction control method for controlling the traction of a vehicle having a throttle and wheels, comprising the steps of:

generating a first feedback variable related to wheel spin error;

generating a second feedback variable by a traction controller, said second feedback variable being related to throttle position, and said traction controller generating said second feedback variable according to the method comprising the steps of:

providing a feedback gain computer for generating a proportional adaptation feedback gain and an integral adaptation feedback gain, which gains adapt on line according to changes in vehicle and engine parameters, and providing a throttle position change computer for generating said second feedback variable; and providing an adaptive throttle controller responsive to said first feedback variable and said second feedback variable for adapting throttle position to prevent wheel slip.

16. An adaptive traction control method as claimed in claim 15 wherein said traction controller controls throttle position according to the method further comprising the step of providing a deadband for system stability.

17. An adaptive traction control method as claimed in claim 15 wherein said step of providing a feedback gain computer further comprises the steps of:

storing a previous wheel spin error;
storing a current wheel spin error;
summing said current wheel spin error and a negative of said previous wheel spin error;
multiplying said first summing means value and said current wheel spin error to provide a multiplied value;
applying a proportional adaptation feedback gain to said multiplied value to provide a first gain value;
squaring said current wheel spin error to provide a squared value;
applying an integral adaptation feedback gain to said squared value to provide a second gain value; and
summing said first gain value and said second gain value to generate a current feedback gain.

18. An adaptive traction control method as claimed in claim 15 wherein said step of providing a throttle position change computer further comprises the steps of:

storing a current wheel spin error;
storing a previous wheel spin error;
providing a signal representing said current wheel spin error minus said previous wheel spin error;
storing a current gain;
storing a previous gain;
providing a signal representing said current gain minus said previous gain;
providing a first summer for generating an adjusted current wheel spin error;
providing a second summer for generating an adjusted current gain; and
providing a third summer for summing said adjusted current gain and said adjusted current wheel spin error to provide a throttle correction signal.

* * * * *